United States Patent [19]

Kugai

[11] Patent Number: 5,065,442
[45] Date of Patent: Nov. 12, 1991

[54] CHARACTER RECOGNITION APPARATUS DETERMINING WHETHER READ DATA IS A CHARACTER LINE

[75] Inventor: Masami Kugai, Yokohama, Japan

[73] Assignee: Canon Kabushiki Kaisha, Tokyo, Japan

[21] Appl. No.: 517,187

[22] Filed: May 1, 1990

[30] Foreign Application Priority Data

May 8, 1989 [JP] Japan .................................. 1-113794

[51] Int. Cl.⁵ .............................................. G06K 9/20
[52] U.S. Cl. ............................................ 382/48; 382/9
[58] Field of Search ............................... 382/9, 18, 48

[56] References Cited

U.S. PATENT DOCUMENTS

| | | | |
|---|---|---|---|
| 4,528,692 | 7/1985 | Umeda et al. | 382/48 |
| 4,562,594 | 12/1985 | Bednar et al. | 382/48 |
| 4,817,186 | 3/1989 | Goolsbey et al. | 382/9 |
| 4,943,801 | 7/1990 | Oguchi | 382/48 |
| 4,965,678 | 10/1990 | Yamada | 382/48 |

Primary Examiner—Stephen Brinich
Attorney, Agent, or Firm—Fitzpatrick, Cella, Harper & Scinto

[57] ABSTRACT

In a character recognition apparatus, the determination processing of whether or not there exists a character line in a segment region is divided into two processes. The initial confirmation process determines the existence or nonexistence of a character line in a segment region having a first size using first determination means. The second confirmation process determines the existence of a character line in a segment region having a second size which is larger than the first size using second determination means. Hence, a noise image is determined to have no character line at a stage in which the segment region has been set to the second size, and a correct character recognition operation is therefore performed. Furthermore, when there is a plane image within the first region, it is determined that there is no character line at a stage in which the small segment region having the first size has been set. Hence, it is possible to shorten the time for the recognition processing.

13 Claims, 6 Drawing Sheets

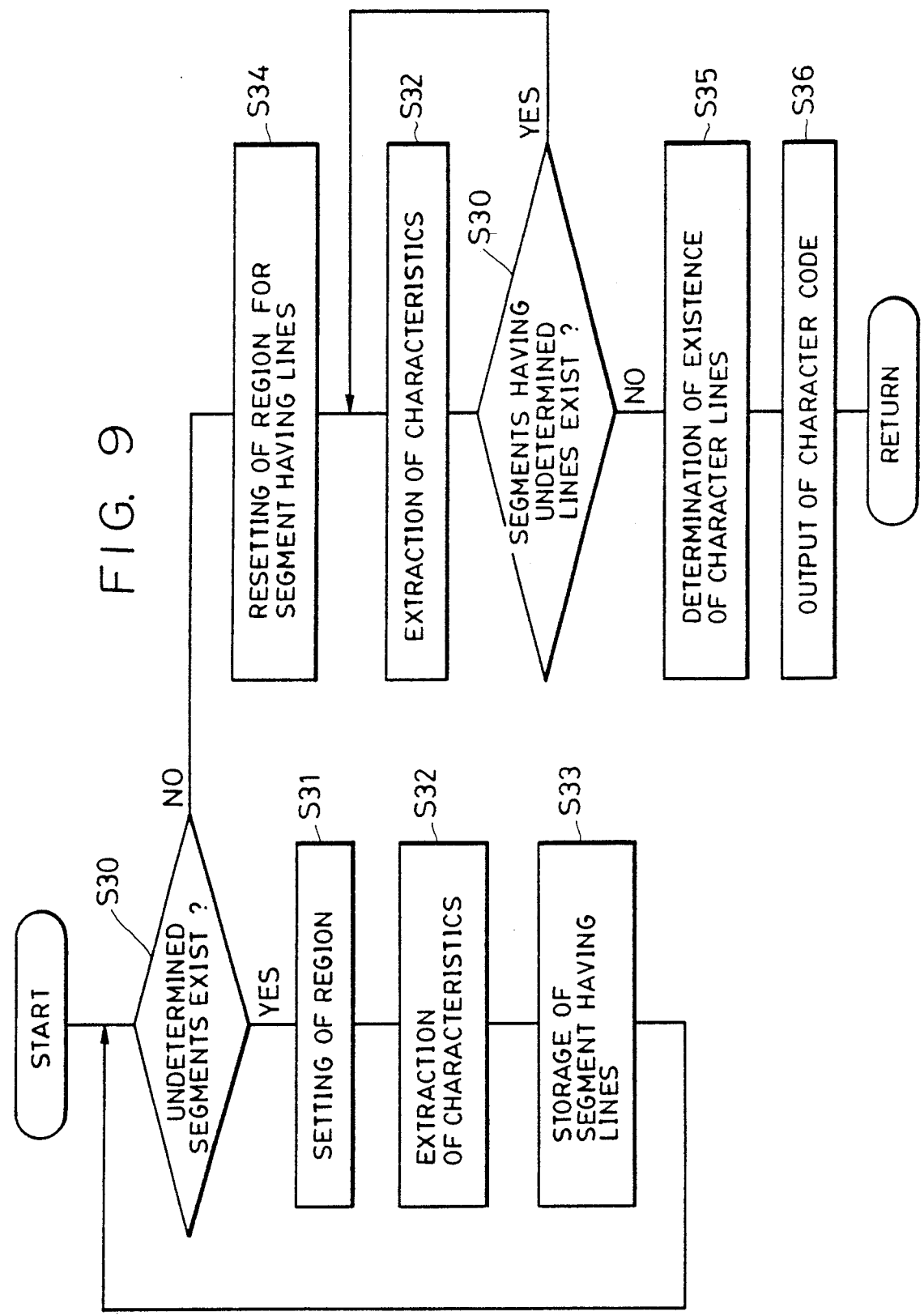

CHARACTER RECOGNITION APPARATUS DETERMINING WHETHER READ DATA IS A CHARACTER LINE

BACKGROUND OF THE INVENTION

1. Field of the Invention

This invention relates to a character recognition apparatus which can very accurately recognize a segment character written by hand in a predetermined character frame (a plurality of segments).

2. Description of the Related Art

Heretofore, in fields in which highly accurate recognition of characters written by hand is needed (for example, in the recognition of a telephone number of a correspondent written by hand in a facsimile), a character frame (segments) having the shape of " " is considered, and the recognition of a numeral is performed for a numeral character written by hand along the segments. In such a recognition method for a segment character, a line-segment region constituting each segment in the shape of " " has previously been set. By determining whether or not the number of black picture elements within each segment region for a character written by hand is larger than a threshold value, it is determined whether or not a character line has been entered in the segment. Finally, a numeral which coincides with a combination of segments in which character lines have been entered is selected.

In a conventional character recognition apparatus using such a method for the recognition of segment characters, however, if there is a noise image, such as a point, a stain or the like, having a number of picture elements larger than a threshold value at the position of segment a2 in a character written by hand, as shown in FIG. 4, it is determined that there is a character line in segment a2, and, for example, the character "0" is misrecognized as "8". Furthermore, a conventional apparatus also misrecognizes due to a snowfall-like noise image as shown in FIG. 5.

SUMMARY OF THE INVENTION

It is an object of the present invention to provide a character recognition apparatus which solves the problems as described above, and which can correctly recognize a character without being influenced by noise, such as a point, a stain or the like.

It is a further object of the present invention to provide a character recognition apparatus for determining whether or not there is a character line within each segment region and for recognizing the segment character using a combination of segments having character lines. The apparatus comprises first region setting means for setting a segment region to a predetermined first size, and first characteristic detection means for detecting a first characteristic value for a character line which is at least one of the width and length of the character line included within the segment region set by the first region setting means. First determination means are provided for comparing the first characteristic value detected by the first characteristic detection means with a first threshold value and for determining that there is no character line within the segment region when the first characteristic value is smaller than the first threshold value. Second region setting means are provided for resetting the segment region to a second size which is larger than the first size when the first characteristic value is larger than the first threshold value as a result of the determination by the first determination means. Second characteristic detection means are provided for detecting a second characteristic value for the character line which is at least one of the width and length of the character line included within the segment region set by the second region setting means when the resetting of the region has been performed by the second region setting means. Finally, second determination means are provided for comparing the second characteristic value detected by the second characteristic detection means with a second threshold value which is larger than the first threshold value and for determining that there is a character line within the segment region only when the second characteristic value is larger than the second threshold value.

It is a still further object of the present invention to provide a character recognition apparatus in which the above-described first characteristic detection means and the second characteristic detection means count the number of black picture elements and the frequency of black-white reversal in picture-element data within the segment region by performing raster scanning within the segment region, and detect the length and width of the character line according to the result of the count.

It is still another object of the present invention to provide a character recognition apparatus which counts the frequency of black-white reversal for picture elements constituting a character line and detects the width and length of the character line according to the frequency of black-white reversal. Hence, even if there is noise, such as a snowfall-like noise or the like, which has previously been misrecognized as a character line, it is possible to positively detect snowfall-like noise from a character line due to the fact that the frequency of black-white reversal becomes larger than a predetermined value.

These and other objects are accomplished, according to one aspect of the present invention, by a character recognition apparatus comprising first region setting means for setting a region to a first size, and first characteristic detection means for detecting a first characteristic value for a character line which is at least one of the width and length of the character line included within the region set by the first region setting means. First determination means are provided for determining the existence of a line within the region from the first characteristic value detected by the first characteristic detection means, and second region setting means are provided for resetting the segment region to a second size which is larger than the first size when it has been determined that there is a character line as a result of the determination by the first determination means. Also, second characteristic detection means are included for detecting a second characteristic value for the character line which is at least one of the width and length of the character line included within the segment region set by the second region setting means, and second determination means are provided for determining whether or not there is an effective line within the region from the second characteristic value detected by the second characteristic detection means.

In accordance with a further aspect of the present invention, character recognition apparatus includes a reader for reading an image on an original and providing image data corresponding thereto. A processor is provided for (1) receiving the image data from the reader, (2) setting a first region of the original, (3) detecting a first characteristic value of image data read from the first region, (4) determining whether the first characteristic value exceeds a first predetermined threshold value, (5) setting a second region having a larger dimension than the first region on the original when the first characteristic value exceeds the first threshold value, (6) detecting a second characteristic value of image data read from the second region, and (7) determining that the image data read from the second region represents a line segment when the second characteristic value exceeds a second predetermined threshold value.

BRIEF DESCRIPTION OF THE DRAWINGS

FIG. 9 is a flowchart showing a control procedure executed by the CPU 5 in a second embodiment of the present invention.

DETAILED DESCRIPTION OF THE PREFERRED EMBODIMENTS

An embodiment of the present invention will now be explained in detail with reference to the drawings.

Figure 1:
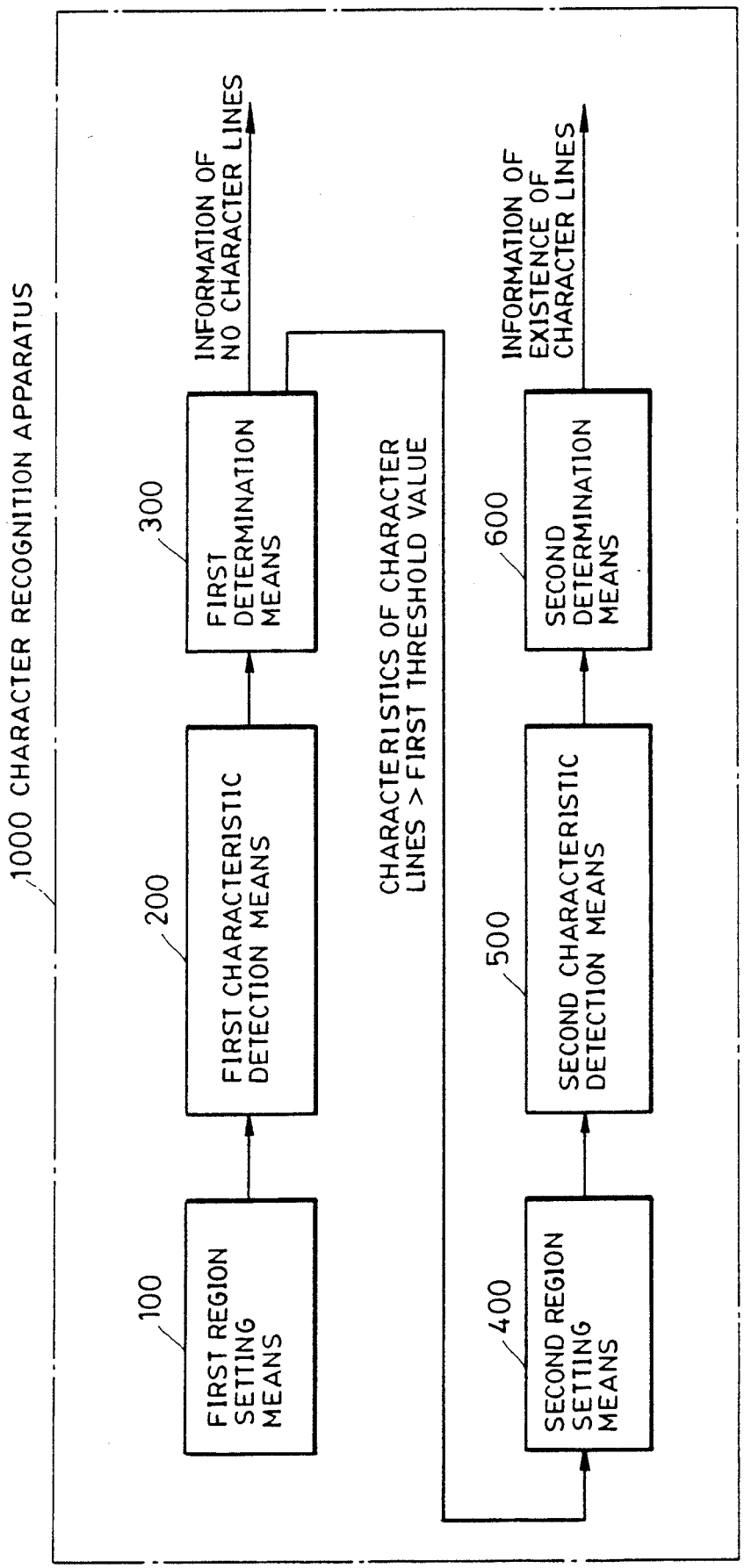
FIG. 1 is a block diagram showing the basic configuration of a first embodiment of the present invention.

FIG. 1 shows the basic configuration of the first embodiment of the present invention.

In FIG. 1, a block 1000 indicated by a one-point chain line represents a character recognition apparatus which determines whether or not there is a character line within each segment region, and which recognizes the kind of a segment character according to a combination of segments having character lines.

First region setting means 100 sets the segment region to a predetermined first size.

First characteristic detection means 200 detects a first characteristic value for a character line which is at least one of the width and length of the character line included within the segment region set by the first region setting means.

First determination means 300 compares the first characteristic value detected by the first characteristic detection means with a first threshold value, and determines that there is no character line within the segment region when the first characteristic value is smaller than the first threshold value.

Second region setting means 400 resets the segment region to a second size which is larger than the first size when the first characteristic value is larger than the first threshold value as a result of the determination by the first determination means.

Second characteristic detection means 500 detects a second characteristic value for a character line which is at least one of the width and length of the character line included within the segment region set by the second region setting means when the second region setting means has reset the region, as described above.

Second determination means 600 compares the second characteristic value detected by the second characteristic detection means with a second threshold value which is larger than the first threshold value, and determines that there is a character line within the segment region only when the second characteristic value is larger than the second threshold value.

Figure 2:
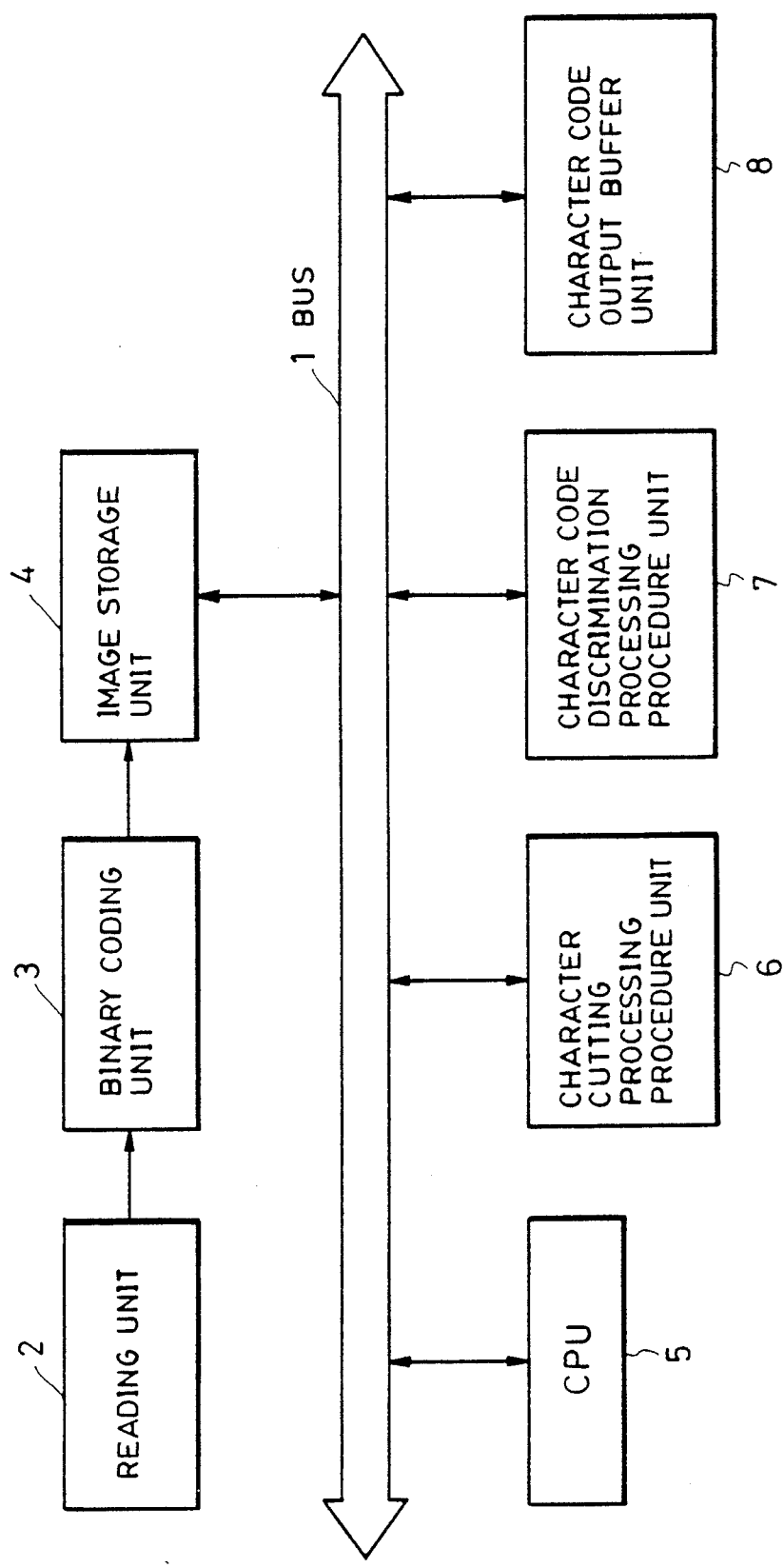
FIG. 2 is a block diagram showing the circuit configuration of the first embodiment of the present invention.

FIG. 2 is a block diagram showing the circuit configuration of the first embodiment of the present invention. In FIG. 2, there is shown a bus 1. A reading unit 2 reads an original. A binary coding unit 3 converts an image read by the reading unit 2 into binary image data. A binary-image storage unit 4 stores the binary image data converted by the binary coding unit 3.

A central processing unit (CPU) 5 includes the first region setting means, second region setting means, first characteristic detection means, second characteristic detection means, first determination means and second determination means for performing the character recognition of the binary image data stored in the binary-image storage unit 4. A character cutting processing procedure unit 6 stores a processing program for cutting one character from the binary image of the original. A character code discrimination processing procedure unit 7 stores a processing program for discriminating a character code for the cut character image by performing a recognition processing of the cut character. A character code output buffer unit 8 temporarily stores the character code as a result of the recognition process.

Figure 3:
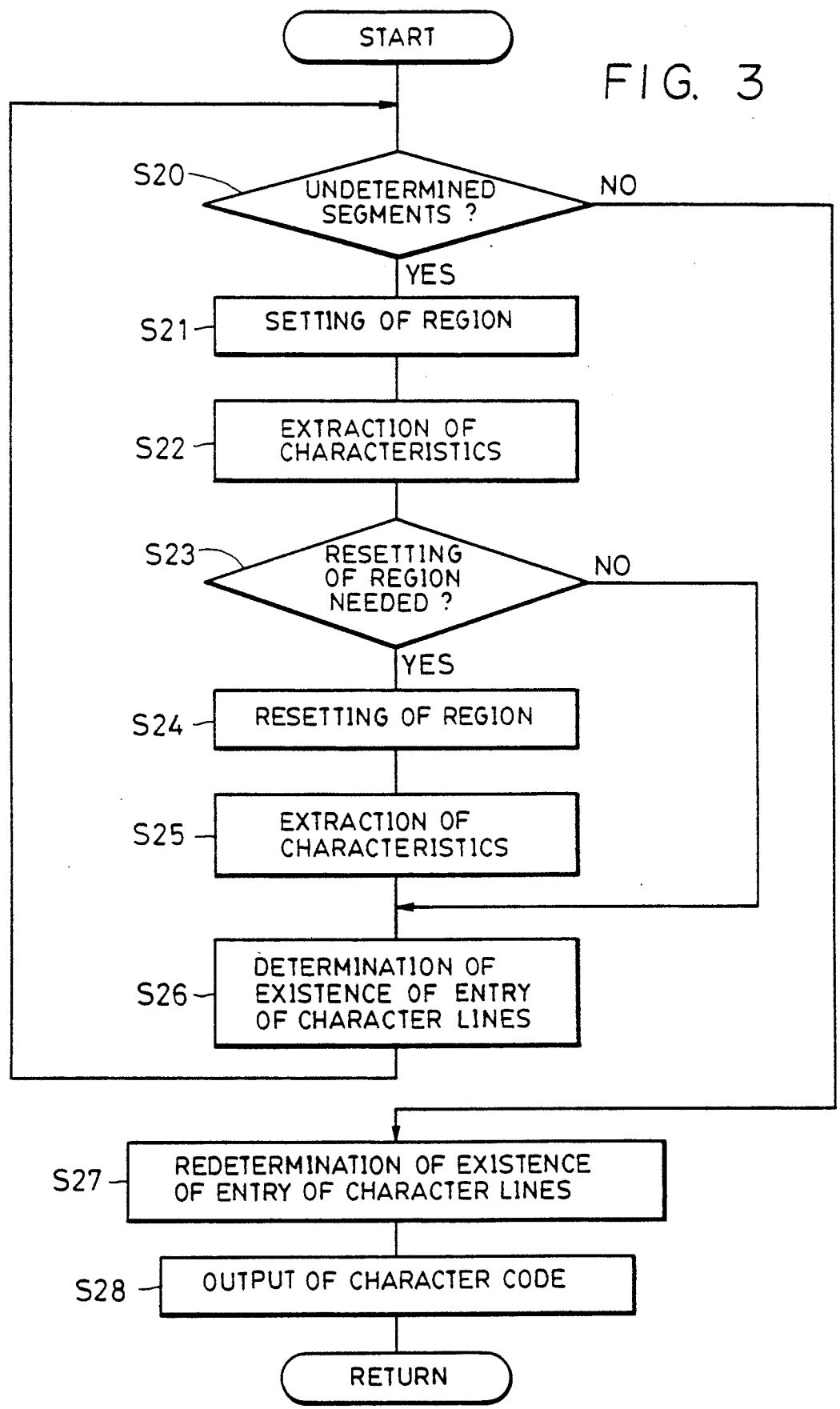
FIG. 3 is a flowchart showing a control procedure executed by a CPU 5 of the first embodiment of the present invention.

Random access memories (RAM's) are used for the character cutting processing procedure unit 6 and the character code discrimination processing procedure unit 7. The above-described processing programs are read by the CPU 5 and are executed therein. The operation of the circuit shown in FIG. 2 will be now explained with reference to FIGS. 3 and 4. FIG. 3 is a flowchart showing the processing program stored in the character code discrimination processing procedure unit 7.

Figure 4:
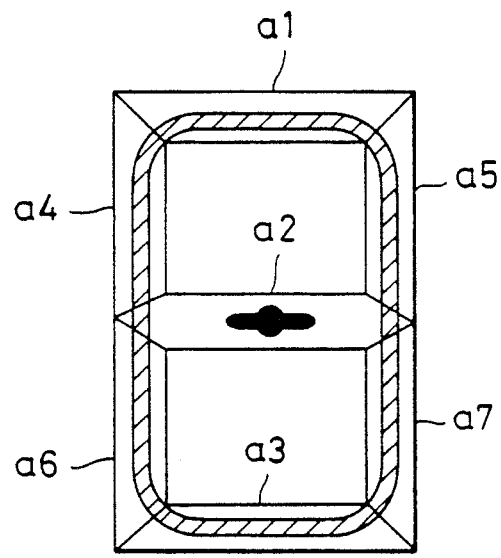
FIGS. 4 and 5 are explanatory diagrams for showing a character written by hand and the relationship between a character frame, an object for discriminating line segments, and noise.

FIG. 4 is a diagram for explaining a character frame for recognizing a numeral character. In FIG. 4, the character frame is made of seven segments a1–a7.

The fact that it is possible to represent a numeral by a pattern provided by a combination of the entry and non-entry of respective segments shown in FIG. 4 is well known, as used in a display unit for numerals and the like in an electronic calculator. A character represented by writing character lines along these segments is termed a "segment character". The present embodiment deals with such a segment character as an object of recognition.

The original to be read includes numerals each of which is formed by entering information in the character frame shown in FIG. 4. In FIG. 2, numeral images on the original are optically read by the reading unit 2, are then converted into binary images, comprising binary image data, by the binary coding unit 3, and are stored in the image memory 4.

Subsequently, the CPU 5 executes a character cutting processing procedure, where a character cutting processing is performed for every character by a well-known character cutting method. The image of a cut character is transmitted to a working area within the character code discrimination processing procedure unit 7 by the CPU 5. The CPU 5 then executes the processing procedure shown in FIG. 3, where character code discrimination processing is performed. That is, in FIG. 3, processes step S20–step S26 are executed by being repeated (looped), for example, seven times, equivalent to the number of segments, and the discrimination processing of segments having line-segment images is performed.

Figure 6:
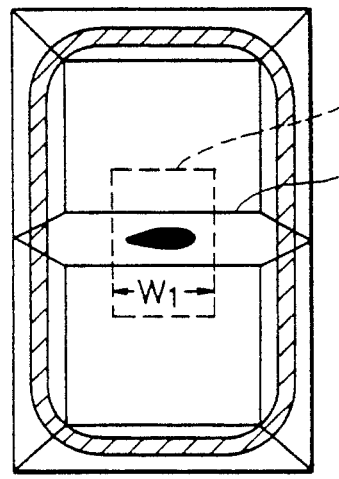
FIGS. 6 and 7 are explanatory diagrams showing image extraction regions as objects of recognition.

Step S20 is a step for determining the end of the loop. If the loop has not been terminated, that is, if there is an undetermined segment, the process proceeds to step S21, where the discrimination processing for the undetermined segment is started. At step S21, a region as an object of discrimination is set for the undetermined segment (assumed to be the K-th segment). For example, for a hand-written character as shown in FIG. 6, a region R1 having a first size is set for segment a2 as an image region for an object of character recognition. The width of the region R1 is represented by $W_1$.

Next, the process proceeds to step S22, where characteristic extraction for an image included within the region R1 is performed. In the present embodiment, the number N6 of black picture elements within the region R1, the frequency t[K] of black-white reversal when raster scanning is performed within the region R1, and projective arrangements of picture elements r[0], r[1], —, r[W-1] on the horizontal axis are obtained as characteristics of a character. The projective arrangement r[i] is an arrangement which has the value of bit "0" if picture elements in the i-th vertical picture-element column from the left end of the region R1 are all white, and has the value of bit "1" if the picture elements are not all white. The process then proceeds to step S23, where it is determined whether or not the change in values when the projective arrangements r[i] (i=0, 1,—, W-1) are scanned from i=0 to i=W−1 becomes bit "0"→"1"→"0", that is, whether or not the frequency of black-white reversal is equal to a first threshold value "2" or less. If the determination is affirmative, the process proceeds to step S24. If the determination is negative, the process proceeds to step S26.

Figure 7:
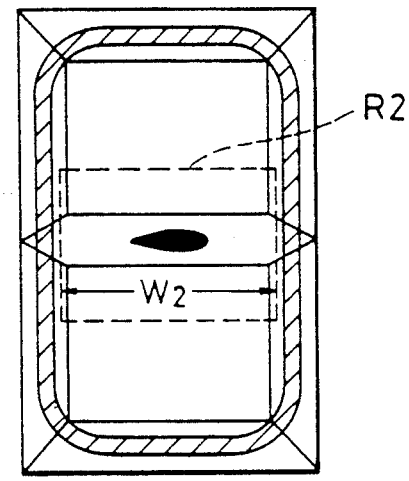

At step S24, the length in the lateral direction of the above-described region is expanded up to a limit in which the change "0"→"1"→"0" in values of projective arrangements of the region for the object of recognition may be maintained, and a new region R2, as shown in FIG. 7, is set. To put it concretely, the lateral width of the region R2 is newly set, for example, to a second size $W_2$.

The process then proceeds to step S25, where the number N6 of black picture elements and the frequency of black-white reversal t[K] within the region R2 are obtained again, and the process proceeds to step S26. At step S26, the line width L[K] is obtained from the calculation formula L[K]=N6/W, and the line width L[K] is compared with a predetermined threshold value Tw. If L[K]≧Tw, it is determined that there is a character line within the segment. If L[K]<Tw, it is determined that there is no character line within the segment.

After the execution of such a series of discrimination processes for the existence of a character line, the process returns to step S20, and the above-described processing procedure (steps S20–S26) is repeated for the next undetermined segment. When the determination of the existence of the entry of character lines has been terminated for all the segments a1–a7 (step S20), the result of the determination of the existence of a character line, the line width L[K] (K=1, —, 7) of each character line and the frequency t[K] (K=1, -, 7) of black-white reversal for each character line are obtained for each segment. Subsequently, at step S27, if it has been confirmed that the relationship between predetermined threshold values (second threshold values) $L_{min}$ and $t_{max}$, and the above-described line width L[K] and the frequency t[K] of black-white reversal is L[K]<$L_{min}$ and t[K]>$t_{max}$, it is determined that there is no character line in the K-th segment irrespective of the result of the determination at step S26.

If L[K]≧$L_{min}$ or t[K]≦$t_{max}$, the result of the determination at step S26 is used without modification. The threshold value $L_{min}$ for the comparison of a line width is determined so as to be $L_{min}$>Tw.

Subsequently, at step S28, a character code is determined from the existence of the entry of character lines for respective segments, and the character code is output to the character code output buffer 8.

Figure 5:
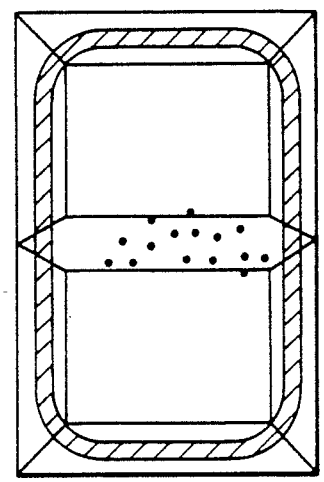

Even if there is a snowfall-like noise as shown in FIG. 5, since t[K]≧$t_{max}$, that is, since the line width is larger than the threshold value as a result of the check of the line width in the above-described processing procedure, it is determined that segment a2 has no character line, and a correct character recognition operation is therefore performed.

As explained above, in the present embodiment, picture-element data for a segment portion are partially extracted from a hand-written character image, and a plane image is detected according to the extracted data. For an image which is not a plane image, the extraction region for the picture-element data is expanded, and it is determined that the width or length of a line segment constituting a segment is included within a predetermined range according to picture-element data newly extracted from the expanded region. Thus, a point image and a line image are discriminated from each other. Accordingly, the processing time becomes shorter than in the case of checking the width or length of a line segment while expanding the extraction region from the first beginning.

Figure 8:
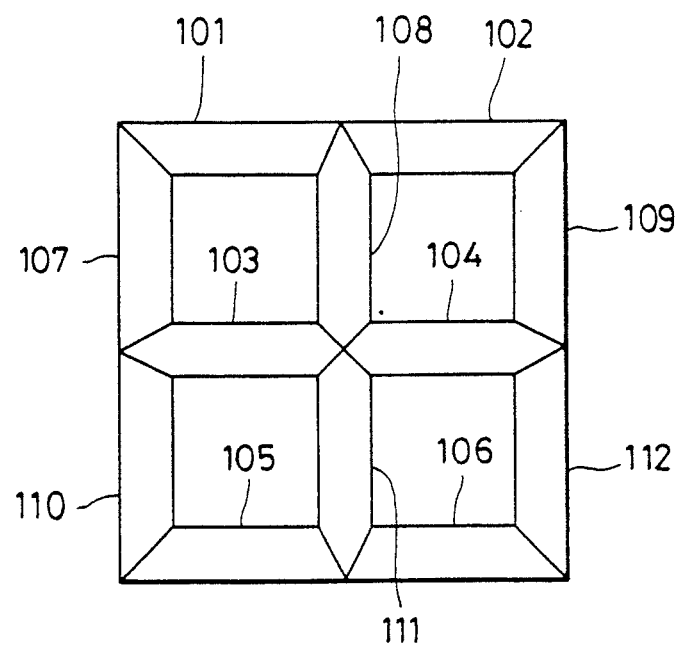
FIG. 8 is an explanatory diagram showing the shape of other segments of the first embodiment of the present invention.

FIG. 8 is a diagram showing another example of the character frame, and shows an example in which the character frame includes twelve segments 101–112. Also for the segment arrangement shown in the FIG. 8 example, the processing procedure, shown in FIG. 3, for determining the existence of a character line for a hand-written character may repeatedly be executed in accordance with the number of segments.

In a first aspect of the present invention, the determination processing of whether or not there exists a character line in a segment region is divided into two processes. The initial confirmation process determines the existence or nonexistence of a character line for a segment region having a first size using first determination means. The final confirmation process determines the existence of a character line for a segment region having a second size which is larger than the first size using second determination means. Hence, a noise image is determined to have no character line at a stage in which the segment region has been set to the second size, and a correct character recognition operation is therefore performed. Furthermore, when there is a plane image within the segment region, it is determined that there is no character line at a stage in which the small segment region having the first size has been set. Hence, it is possible to shorten the time for the recognition processing.

In a second embodiment of the present invention, as shown in FIG. 9, the segment region is set to the first size (S31). After segments having no character lines have been detected (S32–S33), the determination of a segment having a character line is performed at a stage in which the region having the second size has been set (S34). Hence, the frequency of the determination processes at the stage of the second size is reduced, and it is possible to obtain the determination of the existence of character lines and the output of a character code at steps S35 and S36, respectively, It is therefore possible to minimize the time required for the recognition processing.

In a third embodiment of the present invention, the frequency of black-white reversal in picture elements constituting a character line is counted, and the width and length of the character line are detected according to the frequency of black-white reversal. Accordingly, even in a case where the information has previously been misrecognized as a character line, such as a snowfall-like noise or the like, it is possible to positively discriminate between noise, such as a snowfall-like noise or the like, and a character line due to the fact that the frequency of black-white reversal becomes larger than a predetermined value in the case of noise.

The individual components shown in outline or designated by blocks in the Drawings are all well known in the character recognition arts and their specific construction and operation is not critical to the operation or best mode for carrying out the invention.

While the present invention has been described with respect to what is presently considered the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Character recognition apparatus, comprising:
   first region setting means for setting a first region of an original to be recognized to a first size;
   first characteristic detection means for detecting a first characteristic value for a character line, said first characteristic value being at least one of a width and a length of the character line included within the first region set by said first region setting means;
   first determination means for determining the existence of a line within the first region from the first characteristic value detected by said first characteristic detection means;
   second region setting means for resetting the first region to a second size which is larger than the first size when it has been determined that there is a character line as a result of the determination by said first determination means;
   second characteristic detection means for detecting a second characteristic value for the character line, said second characteristic value being at least one of the width and length of the character line included within the second region set by said second region setting means; and
   second determination means for determining whether or not there is an effective line within said region from the second characteristic value detected by said second characteristic detection means.

2. Apparatus according to claim 1, wherein said first characteristic detection means and said second characteristic detection means (1) count the number of black picture elements and the frequency of black-white reversal in picture-element data, respectively, within the first region by performing raster scanning within the first region, and (2) detect the length and width of the character line according to the result of the count.

3. Character recognition apparatus, comprising:
   a processor for (1) setting a first region of an original, (2) detecting a first characteristic value of an image of the original, said first characteristic value being at least one of a width and a length of character line data read from the first region, (3) determining whether the first characteristic value exceeds a first predetermined threshold value, (4) setting a second region for detecting a second characteristic value having a larger dimension than the first region on the original when the first characteristic value exceeds the first predetermined threshold value.

4. Apparatus according to claim 3, wherein the first characteristic value includes at least one of (1) a number of black picture elements within the first region (2) the frequency of black-white reversal of picture elements according to a raster scanning of the first region, and (3) projective arrangements of picture elements on a horizontal axis of the first region.

5. Apparatus according to claim 4, wherein said processor determines that the first characteristic value exceeds the first predetermined threshold value when the frequency of black-white reversal is less than or equal to a first black-white reversal threshold value.

6. Apparatus according to claim 5, wherein the second characteristic value includes at least one of (1) the number of black picture elements within the second region, and (2) the frequency of black-white reversal of picture elements within the second region when the second region is raster scanned.

7. Apparatus according to claim 6, wherein said processor sets the second region to be wider than the first region.

8. Apparatus according to claim 7, wherein said processor determines that the image data read from the second region represents a line segment when a line width of the image data read from the second region is greater than or equal to a predetermined line width, the line width of the read image data being determined in accordance with the number of black picture elements in the second region and the width of the second region.

9. Apparatus according to claim 3, wherein said processor (8) determines that the image data read from the original represents a character line when a plurality of image data read from a plurality of second regions are all determined to be line segments.

10. Character recognition apparatus, comprising:
    a processor for (1) setting a first region of the original, (2) detecting a first characteristic value of image data read from the first region, said first characteristic value including at least one of (a) a number of black picture elements within the first region, (b) the frequency of black-white reversal of picture elements according to a raster scanning of the first region, and (c) projective arrangements of picture elements on a horizontal axis of the first region, and (3) determining whether the first characteristic value exceeds a first predetermined threshold value.

11. Apparatus according to claim 10, wherein said processor sets a second region wider than the first region.

12. Apparatus according to claim 11, wherein said processor determines that the image data read from the second region represents a line segment when a line width of the image data read from the second region is greater than or equal to a predetermined line width, the line width of the read image data being determined in accordance with the number of black picture elements in the second region and the width of the second region.

13. Apparatus according to claim 12, wherein said processor determines that the image data read from the original represents a character line when a plurality of image data read from a plurality of second regions are all determined to be line segments.

* * * * *

UNITED STATES PATENT AND TRADEMARK OFFICE
CERTIFICATE OF CORRECTION

PATENT NO. : 5,065,442
DATED : Nov. 12, 1991
INVENTOR(S) : MASAMI KUGAI

It is certified that error appears in the above-identified patent and that said Letters Patent is hereby corrected as shown below:

<u>COLUMN 1</u>

Line 17, " " " " should read -- 日 --; and
    Line 22, " " " " should read -- 日 --.

<u>COLUMN 7</u>

Line 8, "respectively," should read --respectively.--.

Signed and Sealed this

Twenty-fifth Day of May, 1993

Attest:

MICHAEL K. KIRK

*Attesting Officer*     *Acting Commissioner of Patents and Trademarks*